3,038,001
BICYCLIC THIOPHOSPHATES
Williams S. Wadsworth, Jr., Willow Grove, and William D. Emmons, Huntingdon Valley, Pa., assignors to Rohm & Haas Company, Philadelphia, Pa., a corporation of Delaware
No Drawing. Filed Apr. 21, 1960, Ser. No. 23,617
4 Claims. (Cl. 260—461)

This invention relates to new and useful bicyclic thiophosphates and another aspect of the invention relates to a method for preparing these bicyclic thiophosphates.

The novel compounds of the invention may be characterized by the formula $$RC(CH_2O)_3P(S) \tag{I}$$

in which R is a lower alkyl group containing from 1 to 4 carbon atoms and typified by methyl, ethyl, butyl, propyl, isopropyl, isobutyl and the like; a hydroxylmethyl group; a halomethyl group where the halogen atom has an atomic weight of 9 to 53; an alkoxymethyl or an acyloxymethyl group wherein the alkoxy and the acyl groups contain 1 to 12 carbon atoms.

Typical of the new bicyclic thiophosphates are the following: methyl bicyclic thiophosphate, ethyl bicyclic thiophosphate, isobutyl bicyclic thiophosphate, butyl bicyclic thiophosphate, hydroxymethyl bicyclic thiophosphate, chloromethyl bicyclic thiophosphate, acetoxymethyl bicyclic thiophosphate, butoxymethyl bicyclic thiophosphate, octanoxymethyl thiophosphate, methoxymethyl bicyclic thiophosphate, butanoyloxymethyl bicyclic thiophosphate, octanoyloxymethyl bicyclic thiophosphate and the like.

These new bicyclic thiophosphates are very valuable pesticidal compounds useful as fungicides, bactericides and particularly as insecticides.

The bicyclic thiophosphates are prepared by a method which comprises reacting a bicyclic phosphite of the formula $$RC(CH_2O)_3P \tag{II}$$

in which R has the same definition as in Formula I, with a source of sulfur.

Typical starting bicyclic phosphites are

Methyl bicyclic phosphite,
Ethyl bicyclic phosphite,
Butyl bicyclic phosphite,
Isobutyl bicyclic phosphite, and
Isobutyl bicyclic phosphite.

In a preferred embodiment of the method of preparation, a cyclic phosphite of Formula II is reacted with an alkyl mercaptan,

RSH

In a favored aspect of the method, a liquid alkyl mercaptan is reacted with a bicyclic phosphite, preferably in the presence of an azo type catalyst.

Typical alkyl mercaptans may be represented by the formula

RSH in which R represents an alkyl radical that may be branched or straight containing 1 to 18 carbon atoms.

Typical of these mercaptans are the following: methyl mercaptan, ethyl mercaptan, n-propyl mercaptan, isopropyl mercaptan, n-butyl mercaptan, isobutyl mercaptan, n-amyl mercaptan, octyl mercaptan, dodecyl mercaptan, and octadecyl mercaptan. Amongst these mercaptans, liquid mercaptans, such as those having a carbon content of 3 to 10 are preferred. When the mercaptan is a solid, it is preferable to carry out the reaction in the presence of an inert organic solvent.

Typical solvents include aromatic hydrocarbons, such as benzene, toluene, xylene; chlorinated hydrocarbons, such as monochlorobenzene and dichlorobenzene; nitroaromatic hydrocarbons such as nitrobenzene, o-, m- or p-dinitrobenzene, o-nitrotoluene, 2,4,6-trinitro-m-xylene; chlorinated aliphatic hydrocarbons, such as chloroform, carbon tetrachloride, methylene chloride, ethylene dichloride and tetrachloride, methylene chloride, ethylene dichloride and ethers, such as dimethyl ether, dioxane or dimethoxyethane.

In a preferred aspect of the method, the reaction is carried out in the presence of acyclic azo type catalysts. These compounds are characterized by the group —N=N—, which is attached to aliphatic carbon atoms, at least one of which is tertiary. Typical azo catalysts are azodiisobutyronitrile, azodiisobutyramide, dimethyl (or diethyl) azodiisobutyrate, azobis($\alpha,\gamma$-dimethylvaleronitrile), azobis($\alpha$-methylbutyronitrile), azobis($\alpha$-methylvaleronitrile), dimethyl azobismethylvalerate, and the like. Such catalysts are used in the smallest amount that will promote the reaction by the cyclic phosphite and the source of sulfur, an amount ranging from .01 to 5 mole percent being a suitable range.

In the method of the invention, the reaction proceeds with great ease. Hence, the particular temperature at which it is carried out is not critical but, for practical reasons, it is preferred to carry it out in the range from 20° to 200° C. For best results, it is preferred that the reaction is carried out in the range of 80° to 120° C. In accordance with the process of the invention, the bicyclic phosphite and the sulfur-providing reactant, such as the alkyl mercaptans, are generally used in stoichiometric amounts, although an excess of the sulfur-containing reactant is not detrimental.

The products are high-melting solids which generally precipitates out from the reaction mixture.

The bicyclic thiophosphates of the invention are very useful pesticides that are especially useful as insecticides. The bicyclic thiophosphates are particularly useful in the control of flies, mites, aphids, spiders, mosquitoes, army worms, weevils, and the like. They may be used as contact, stomach or systemic fungicides. They may be extended with a carrier or diluent before application to plants; they may be used in the form of dusts, wettable powders, or emulsifiable concentrates. Dusts may contain from 1 to 10% of a phosphonate, which is dispersed in or coated on a finely divided solid, such as talc, clay, silica, calcium or magnesium carbonate, or other finely divided inert solid or mixtures thereof. A dispersing agent, such as a condensed naphthalene-formaldehyde sodium sulfonate or a lignin sulfonate, may be added.

Wettable powders may be similarly prepared except that the proportion of phosphate is made higher and usually a wetting agent is added. Wettable powders may also be prepared by milling phosphate and solid carrier together. Wettable powders usually contain 20% to 30% of phosphate, 1 to 2% of a dispersing agent, and 1 to 4% of a wetting agent, such as an alkylphenoxypolyethoxyethanol or other non-ionic agent, a sodium alkylbenzenesulfonate, sodium lauryl sulfate and comparable sodium alkyl sulfates and sulfonates, octylphenoxyethoxyethoxyethyl sodium sulfonate, and the like.

The bicyclic thiophosphates of the invention may also be used for solutions in organic solvents; solutions in an inert organic solvent, such as toluene, xylene, or an aromatic naphtha are treated with an oil-soluble emulsifying agent, such as an octylphenoxypolyethoxyethanol or such agent plus calcium dodecylbenzenesulfonate. The solution may contain 10 to 25% of the toxicant and 2 to 6% of emulsifier. When this composition is extended with water, it provides a spray in which the toxicant is well dispersed. Also, the phosphates may be used as their aqueous solutions, with or without an emulsifier such as those described above.

A typical formulation may be prepared by mixing 25 parts of ethyl bicyclic thiophosphate and 66 parts of clay and adding thereto three parts of octylphenoxypolyethoxyethanol on five parts of magnesium carbonate and 1 part of sodium naphthaleneformaldehyde sulfonate.

A typical emulsifiable concentrate is made from 25 parts of ethyl bicyclic thiophosphate, 71 parts of xylene, 3 parts of an emulsifier from polyglycerol oleic acid and a small amount of phthalic acid and 1 part of nonylphenoxypolyethoxyethanol.

The following examples, in which all parts are by weight unless otherwise indicated, are offered as illustrative of the method of the invention and are not intended to be construed as a limitation thereof.

*Example 1*

(a) 32.4 parts of ethyl bicyclic phosphite are added to 29.2 parts of n-octyl mercaptan. There is added 0.65 part of azodiisobutyronitrile and the solution is gently heated with stirring to 100° C. As the reaction takes place, a slight exotherm increases the temperature to 110° C., at which the solution is maintained for one hour. Upon cooling the solution to 30° C., the solution deposits white crystals of ethyl bicyclic thiophosphate, which are removed by suction filtration. The precipitate is recrystallized from alcohol. It is found to have a melting point of 176° to 178° C. Analysis confirms the structure of the thiophosphate.

Calculated for $C_6H_{11}O_3SP$: C, 37.18; H, 5.67; S, 16.51; and P, 15.98. Found: C, 37.20; H, 5.64; S, 16.32; and P, 16.24.

From the filtrate, there is distilled n-octane.

(b) Ethyl bicyclic phosphite is substituted by methyl bicyclic phosphite and the reaction gave methyl bicyclic thiophosphate.

(c) Likewise, n-octyl mercaptan is substituted by hexyl mercaptan. In both instances, the same product is obtained, n-hexane being distilled off at the end of the reaction.

(d) The reaction is carried out as indicated under (a), except that azodiisobutyronitrile is omitted. The same product, ethyl bicyclic thiophosphate, is obtained.

*Example 2*

There are reacted 52.48 parts of hydroxymethyl bicyclic phosphite with 26 parts of n-octyl mercaptan in the presence of 0.65 part of azodiisobutyronitrile by gently heating to 100° C. Following the procedure of Example 1, there is isolated the product, hydroxymethyl bicyclic thiophosphate.

Likewise, the reaction of chloromethyl bicyclic phosphite with n-hexyl mercaptan yields chloromethyl bicyclic thiophosphate.

In a like manner, acetoxymethyl bicyclic thiophosphate is obtained from the reaction of n-octyl mercaptan with acetoxymethyl bicyclic phosphite. And, methoxymethyl bicyclic thiophosphate is the product of methoxymethyl bicyclic thiophosphite with n-octyl mercaptan.

We claim:

1. A method for the preparation of ethyl bicyclic thiophosphate which comprises reacting ethyl bicyclic phosphite with n-octyl mercaptan in the presence of azodiisobutyronitrile at a temperature in the range of 80° to 120° C.

2. A method for the preparation of a bicyclic thiophosphate which comprises contacting an alkyl mercaptan of the formula $$RSH$$

in which R is a lower alkyl group, with a bicyclic phosphite of the formula $$RC(CH_2O)_3P \qquad (II)$$

in which R is a lower alkyl group, at a temperature of 20° to 200° C. in the presence of an inert organic solvent.

3. A method for the preparation of bicyclic thiophosphates which comprises contacting a bicyclic phosphite of the formula $$RC(CH_2O)_3P$$

with a liquid alkyl mercaptan of the formula $$RSH$$

in which R is a lower alkyl group, at a temperature in the range of 20° to 200° C.

4. A method for the preparation of bicyclic thiophosphates which comprises contacting a bicyclic phosphite of the formula $$RC(CH_2O)_3P$$

with a liquid alkyl mercaptan of the formula $$RSH$$

in which R is a lower alkyl group in the presence of an acyclic azo catalyst within the temperature range of 80° to 120° C.

No references cited.